(12) United States Patent
Luo et al.

(10) Patent No.: US 12,085,741 B2
(45) Date of Patent: Sep. 10, 2024

(54) METHOD FOR PREPARING SUPER-RESOLUTION LENS BASED ON METAL-DIELECTRIC STRIP ARRAY, AND USING METHOD OF SUPER-RESOLUTION LENS

(71) Applicant: THE INSTITUTE OF OPTICS AND ELECTRONICS, THE CHINESE ACADEMY OF SCIENCES, Sichuan (CN)

(72) Inventors: Xiangang Luo, Sichuan (CN); Yunfei Luo, Sichuan (CN); Kaipeng Liu, Sichuan (CN); Yu Gu, Sichuan (CN); Ping Gao, Sichuan (CN); Zeyu Zhao, Sichuan (CN)

(73) Assignee: THE INSTITUTE OF OPTICS AND ELECTRONICS, THE CHINESE ACADEMY OF SCIENCES, Sichuan (CN)

( * ) Notice: Subject to any disclaimer, the term of this patent is extended or adjusted under 35 U.S.C. 154(b) by 0 days.

(21) Appl. No.: 18/575,647

(22) PCT Filed: Dec. 22, 2021

(86) PCT No.: PCT/CN2021/140484
§ 371 (c)(1),
(2) Date: Dec. 29, 2023

(87) PCT Pub. No.: WO2023/108756
PCT Pub. Date: Jun. 22, 2023

(65) Prior Publication Data
US 2024/0264343 A1    Aug. 8, 2024

(30) Foreign Application Priority Data
Dec. 15, 2021 (CN) .......................... 202111538112.9

(51) Int. Cl.
G02B 13/14 (2006.01)
G01N 23/00 (2006.01)
(Continued)

(52) U.S. Cl.
CPC ............ G02B 5/1857 (2013.01); G02B 1/002 (2013.01)

(58) Field of Classification Search
CPC .............................. G02B 5/1857; G02B 1/002
(Continued)

(56) References Cited

U.S. PATENT DOCUMENTS

2009/0261250 A1  10/2009  Zhou et al.
2013/0143149 A1   6/2013  Kang et al.

FOREIGN PATENT DOCUMENTS

CN  101424758 A  5/2009
CN  101441325 A  5/2009
(Continued)

OTHER PUBLICATIONS

WIPO/ISA/CNIPA, International Search Report and Written Opinion issued on Sep. 15, 2022 in PCT/CN2021/140484, 7 pages.
(Continued)

*Primary Examiner* — Joseph P Martinez
*Assistant Examiner* — Grant A Gagnon
(74) *Attorney, Agent, or Firm* — J. Peter Paredes; Amin Wasserman Gurnani LLP (57) ABSTRACT

A method for preparing a metal-dielectric strip array based super-resolution lens includes: performing lithography on a first material layer on a first substrate to obtain a grating structure; alternately depositing second and third material layers until the grating structure is filled up, to obtain a first transition structure, one of the second and third material layers being of metal, and the other one being of dielectric; performing planarization on the first transition structure at
(Continued)

least reach the top of the grating structure, to obtain a second transition structure; adhering an upper surface of the second transition structure to a second substrate; removing the first substrate, and performing overturning to make the second transition structure be on the second substrate to obtain a third transition structure; and performing planarization again to at least reach the top of finally deposited second or third material layer, to obtain the super-resolution lens.

13 Claims, 7 Drawing Sheets

(51) Int. Cl.
      *G02B 1/00*       (2006.01)
      *G02B 5/18*       (2006.01)
      *G02B 9/00*       (2006.01)

(58) Field of Classification Search
      USPC .......................................................... 359/569
      See application file for complete search history.

(56) References Cited

FOREIGN PATENT DOCUMENTS

| | | | |
|---|---|---|---|
| CN | 102621601 | A | 8/2012 |
| CN | 102621602 | A | 8/2012 |
| CN | 102621803 | A | 8/2012 |
| CN | 102633229 | A | 8/2012 |
| CN | 106450593 | A | 2/2017 |
| CN | 110347014 | A | 10/2019 |
| CN | 112180486 | A | 1/2021 |
| CN | 112350680 | A | 2/2021 |
| CN | 112601990 | A | 4/2021 |

OTHER PUBLICATIONS

CNIPA, Notification to Grant Patent Right for Invention of priority application 2021115381129, Mar. 23, 2023, 2 pages.
CNIPA, First Office Action issued in priority application 202111538112.9, Feb. 15, 2023, 4 pages.
Kim, M et al. "Observation of enhanced optical spin Hall effect in a vertical hyperbolic metamaterial" ACS Photonics Jun. 10, 2019, 2530-2536.

METHOD FOR PREPARING SUPER-RESOLUTION LENS BASED ON METAL-DIELECTRIC STRIP ARRAY, AND USING METHOD OF SUPER-RESOLUTION LENS

CROSS-REFERENCE TO RELATED APPLICATIONS

The present disclosure application claims priority to PCT application serial no. PCT/CN2021/140484 filed Dec. 22, 2021, which claims priority to the Chinese patent application No. 202111538112.9, filed on Dec. 15, 2021, the contents of which are incorporated by reference herein in their entireties.

The present disclosure claims priority to the Chinese patent application No. 202111538112.9, filed on Dec. 15, 2021, the contents of which are incorporated by reference herein in entirety.

TECHNICAL FIELD

The present disclosure relates to the technical field of super-resolution imaging, and specifically to a method for preparing a super-resolution lens based on a metal-dielectric strip array and use of the super-resolution lens.

BACKGROUND ART

In recent years, with the rapid development of micro-nano technologies, a series of novel optical phenomena of surface plasmas in sub-wavelength structures are discovered in succession, which arouses great research interest in the scientific community. Various reports on the application of singular optical properties of the surface plasmas emerge one after another, for example, super-resolution imaging, novel light-emitting diode, micro-scale nano laser, etc., revealing their important role in overcoming optical behavior of diffraction limit. The revelation and research on the extraordinary enhanced optical transmission effect of the surface plasmas boost the development of design and application research of optical properties of super-diffraction metamaterials (artificial electromagnetic materials). A composite multilayer film lens structure in which metal layers and dielectric layers are alternating, as one of the typical applications of metamaterials, has inspired the research interest of many researchers.

Researches find that a super lens made of a metamaterial having a negative refractive index may amplify attenuated evanescent waves, so as to realize super-resolution imaging. Earlier researches also find that a multilayer film structure formed by alternately stacking metal/dielectric whose thickness is far smaller than wavelength can realize SP wave (surface plasma wave) coupled transmission, thereby realizing super-resolution imaging. However, all the existing metal-dielectric multilayer film lens structures fabricated by alternately growing film layers are planar multilayer films, thus incident light needs to continuously penetrate through the multilayer film structure many times, to finally arrive at an imaging material. Since a dielectric constant of a metal material generally has a certain imaginary part, the incident light inevitably loses energy during the transmission. After the incident light is transmitted through the multilayer film, energy that arrives at the imaging material usually only accounts for $1/100$ of an initial value of the incident light, or even $1/1000$ or lower, which severely limits practical application of the metal-dielectric multilayer film lens in the super-resolution imaging.

SUMMARY

(I) Technical Problem to be Solved

In view of the above problems, the present disclosure provides a method for preparing a super-resolution lens based on a metal-dielectric strip array and use of the super-resolution lens, for solving the technical problems such as high energy loss of the conventional super-resolution lens.

(II) Technical Solution

In one aspect, the present disclosure provides a method for preparing a super-resolution lens based on a metal-dielectric strip array, including: S1, performing lithography on a first material layer on a first substrate to obtain a grating structure; S2, alternately depositing a second material layer and a third material layer on the grating structure until the grating structure is filled up and becomes even, so as to obtain a first transition structure, wherein one of the second material layer and the third material layer is of metal, and the other one is of dielectric; S3, performing planarization on the first transition structure, wherein the planarization is made in a depth direction, to at least reach a top portion of the grating structure, so as to obtain a second transition structure; S4, adhering an upper surface of the second transition structure to a second substrate; S5, removing the first substrate, and performing overturning to make the second transition structure be on the second substrate, to obtain a third transition structure; and S6, performing planarization on the third transition structure, wherein the planarization is made in a depth direction to at least reach a top portion of the second material layer or the third material layer which is finally deposited in the S2, so as to obtain the super-resolution lens based on a metal-dielectric strip array.

Further, the S1 includes: S11, preparing a sacrificial layer, the first material layer, and a photosensitive film layer on the first substrate in sequence from bottom to top; S12, performing exposure and development on the photosensitive film layer to obtain a photosensitive film grating pattern; and S13, etching the first material layer, to transfer the photosensitive film grating pattern into the first material layer to obtain the grating structure.

Further, the step of preparing the sacrificial layer in the S11 includes: preparing the sacrificial layer on the first substrate by a method of magnetron sputtering deposition, chemical vapor deposition or coating, wherein the sacrificial layer is of one of Au, Cu, and a photosensitive resist. The step of preparing the first material layer in the S11 includes: preparing the first material layer on the sacrificial layer by a method of magnetron sputtering deposition, atomic layer deposition, chemical vapor deposition or vacuum evaporation deposition, wherein the first material layer is of one of Ag, Al, and a dielectric material.

Further, the S5 includes: removing the first substrate by stripping, and performing overturning to make the second transition structure be on the second substrate; and removing the sacrificial layer by a wet chemical method, to obtain a third transition structure, wherein the stripping comprises manual stripping or automatic stripping, and a solution used in the wet chemical method is one of aqua regia, nitric acid, and a chromium removal solution.

Further, for the grating structure in the S1, a feature size is 5~300 nm, and a pattern duty cycle is 0.05~0.5.

Further, the alternately depositing the second material layer and the third material layer on the grating structure in the S2 includes: alternately depositing the second material layer of a second layer thickness and the third material layer with a third layer thickness on the grating structure, the second layer thickness being the same as or different from the third layer thickness; and the metal in the S2 is one of Ag and Al, and the dielectric is one of $SiO_2$, $Al_2O_3$, and $MgF_2$.

Further, the step of performing planarization on the first transition structure in the S3, and the step of performing planarization on the third transition structure in the S6 include: performing the planarization on the first transition structure and the third transition structure by ion beam etching or chemical mechanical polishing.

Further, the adhering the upper surface of the second transition structure to the second substrate in the S4 includes: adhering the upper surface of the second transition structure to the second substrate with a curing agent, wherein the first substrate is one of a silicon substrate, a quartz substrate, a magnesium fluoride substrate, and a flexible substrate; and the second substrate is one of a quartz substrate, a silicon substrate, and a sapphire substrate.

Further, a lithography method for performing lithography on the first material layer on the first substrate in the S1 is one of surface plasma lithography, electron beam direct writing lithography, and near field lithography.

Further, a deposition method of alternately depositing the second material layer and the third material layer on the grating structure in the S2 is one of magnetron sputtering deposition, atomic layer deposition, chemical vapor deposition, and vacuum evaporation deposition.

In another aspect, the present disclosure provides a super-resolution lens based on a metal-dielectric strip array, wherein the super-resolution lens based on a metal-dielectric strip array includes the super-resolution lens based on a metal-dielectric strip array obtained by the method for preparing a super-resolution lens based on a metal-dielectric strip array according to any one of the preceding.

In a further aspect, the present disclosure provides use of a super-resolution lens obtained by the method for preparing a super-resolution lens based on a metal-dielectric strip array according to the preceding in super-resolution lithography.

(III) Beneficial Effects

For the method for preparing a super-resolution lens based on a metal-dielectric strip array and the use in the present disclosure, the super-resolution lens based on a metal-dielectric strip array is obtained through process steps such as etching, alternately depositing of metal and dielectric film layers, pattern overturning, and planarization. In the super-resolution lens obtained according to the preparation method in the present disclosure, incident light does not need to penetrate through a metal film layer many times in a metal-dielectric strip array structure, and is only transmitted along metal-dielectric interfaces, which effectively improves the energy utilization efficiency, and expands the application range of the super-resolution lithography technology.

ILLUSTRATION OF REFERENCE SIGNS

1, first substrate; 2, sacrificial layer; 3, first material layer; 4, photosensitive film grating pattern; 5, second material layer; 6, third material layer; 7, second material layer; 8, curing agent; 9, second substrate.

DETAILED DESCRIPTION OF EMBODIMENTS

In order to make the objectives, technical solutions and advantages of the present disclosure clearer and more understandable, the present disclosure is further described in detail below with reference to drawings and in conjunction with embodiments.

The terms used in the present disclosure are merely for describing the embodiments, rather than limiting the present disclosure. The terms "include", "contain", etc. used herein indicate existence of the features, steps, operations and/or components, but do not exclude existence or addition of one or more other features, steps, operations, or components.

The ordinals used in the description and the claims, such as "first", "second", and "third", are used to modify corresponding elements, while they themselves do not mean or represent any order of the elements, or represent sequence of one element with another, or sequence of steps in a manufacturing method. These ordinals are only used to clearly distinguish an element with a certain name from another element with the same name.

Figure 1:
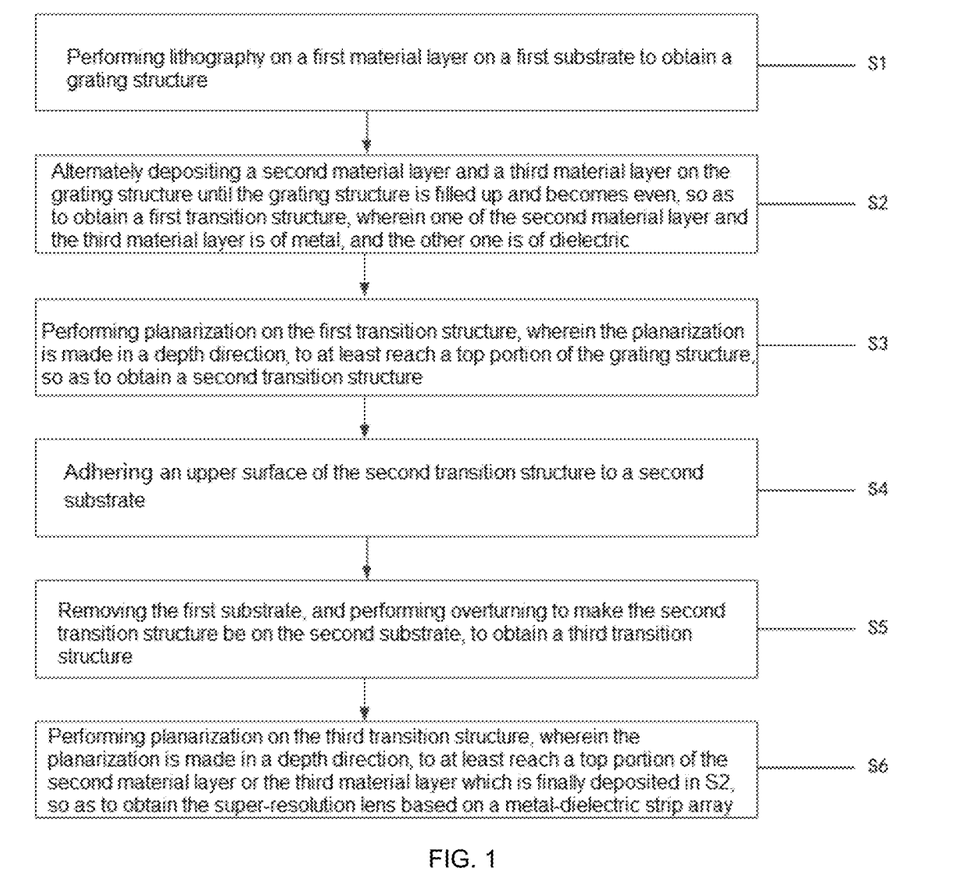
FIG. 1 schematically shows a flowchart of a method for preparing a super-resolution lens based on a metal-dielectric strip array according to embodiments of the present disclosure.

Embodiments of the present disclosure provide a method for preparing a super-resolution lens based on a metal-dielectric strip array, with reference to FIG. 1, including: S1, performing lithography on a first material layer on a first substrate to obtain a grating structure; S2, alternately depositing a second material layer and a third material layer on the grating structure until the grating structure is filled up and becomes even, so as to obtain a first transition structure, wherein one of the second material layer and the third material layer is of metal, and the other one is of dielectric; S3, performing planarization on the first transition structure, wherein the planarization is made in a depth direction, to at least reach a top portion of the grating structure, so as to obtain a second transition structure; S4, adhering an upper surface of the second transition structure to a second substrate; S5, removing the first substrate, and performing overturning to make the second transition structure be on the second substrate, to obtain a third transition structure; and S6, performing planarization on the third transition structure, wherein the planarization is made in a depth direction, to at least reach a top portion of the second material layer or the third material layer which is finally deposited in S2, so as to obtain the super-resolution lens based on a metal-dielectric strip array.

Figure 2A:
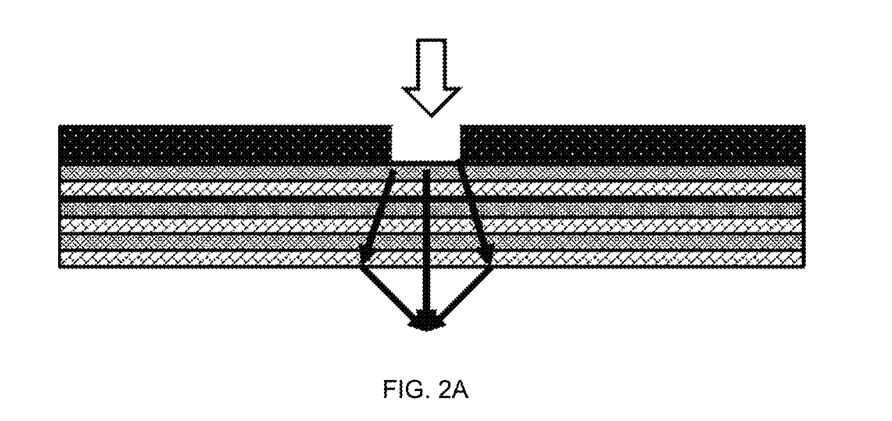
FIG. 2A schematically shows a schematic diagram of an existing super-resolution lens structure of a metal-dielectric multilayer film and an optical path.
Figure 2B:
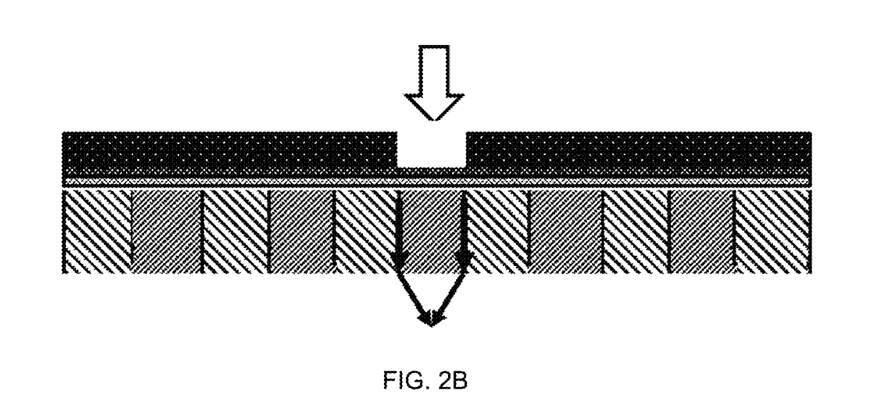
FIG. 2B schematically shows a schematic diagram of a super-resolution lens structure based on a metal-dielectric strip array and an optical path according to embodiments of the present disclosure.

For the problem of high energy loss in the existing metal-dielectric multilayer film lens structure, the present disclosure designs a multilayer film lens structure, in which incident light is transmitted along metal-dielectric interfaces. FIG. 2A is a schematic diagram of an existing super-resolution lens structure of a metal-dielectric multilayer film structure and an optical path. FIG. 2B is a schematic diagram of a super-resolution lens structure based on a metal-dielectric strip array and an optical path according to the present disclosure. In FIG. 2A, incident light needs to penetrate through a planar multilayer film, then a lot of energy is lost as a dielectric constant of a metal material generally has a certain imaginary part. However, the metal portion of the strip array in the present disclosure is relatively thick, exceeding 10 nm, then light cannot directly penetrate therethrough, and only can be transmitted along the metal-dielectric interfaces to penetrate through the lens, thereby greatly reducing the energy loss.

Super-resolution lenses require quite high degrees of surface flatness, thus a desired periodic structure of the metal-dielectric strip array cannot be obtained directly by lithography and deposition methods. Accordingly, the super-resolution lens based on a metal-dielectric strip array is obtained by designing process steps such as etching, alternately depositing of metal and dielectric film layers, pattern overturning, and planarization in the present disclosure.

Specifically, firstly, the grating structure needs to be obtained by etching the first material layer on the flat first substrate, wherein the grating structure is configured to limit a feature size of a strip structure and an initial position of the array; next, a metal material layer and a dielectric material layer are alternately deposited on the grating structure, and the grating structure is just filled up and becomes even with the material layer which is finally deposited; then planarization is performed for a first time, wherein the planarization this time is to ensure flatness of an upper surface of the metal-dielectric strip array; then the planarized upper surface and the second substrate are adhered together, and the first substrate is removed, to realize the overturning of the structure; and finally, the planarization is performed for a second time, wherein the planarization this time is to ensure flatness of an upper surface after overturning of the metal-dielectric strip array structure. Through the two times of planarization, the flatness of the upper and lower surfaces of the strip array is ensured, which helps to improve a focusing imaging effect.

Further, it is also necessary to accurately design layer thicknesses of the second material layer and the third material layer that are alternately deposited, so that the layer thickness of the material layer finally deposited is exactly equal to the layer thickness of corresponding metal material layer or dielectric material layer, thereby ensuring that the periodic structure of the metal-dielectric strip array finally obtained is not destroyed.

Figure 3:
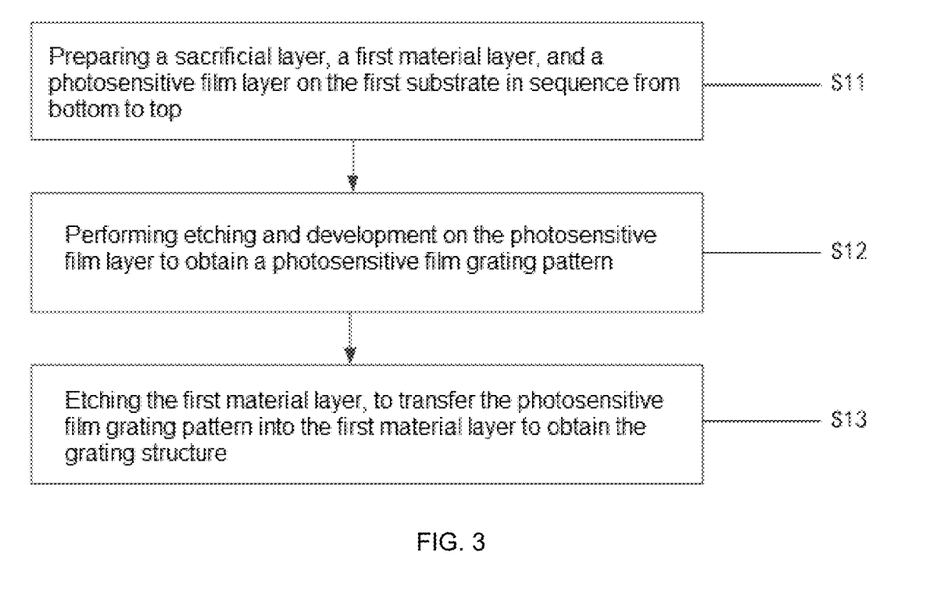
FIG. 3 schematically shows a flowchart of a method of performing lithography on a first material layer on a first substrate according to embodiments of the present disclosure.

FIG. 3 schematically shows a flowchart of a method of performing lithography on the first material layer on the first substrate according to embodiments of the present disclosure.

As shown in FIG. 3, the method of performing lithography on the first material layer on the first substrate may include steps S11~S13. In step S11, a sacrificial layer, a first material layer, and a photosensitive film layer are prepared on the first substrate in sequence from bottom to top. In step S12, exposure and development are performed on the photosensitive film layer to obtain a photosensitive film grating pattern. In step S13, the first material layer is etched, to transfer the photosensitive film grating pattern into the first material layer to obtain the grating structure.

The sacrificial layer may be prepared on the first substrate by a method of magnetron sputtering deposition, chemical vapor deposition or coating. The sacrificial layer is prepared for removing the first substrate in a subsequent stripping process, and realizing the overturning of the structure. A material of the sacrificial layer may be one of Au, Cu, and a photosensitive resist. Certainly, the sacrificial layer is not limited to the three materials herein, while other materials with low adhesion to a base may also be applied to the solutions of the present disclosure.

The first material layer may be prepared on the sacrificial layer by a method of magnetron sputtering deposition, atomic layer deposition, chemical vapor deposition or vacuum evaporation deposition. The first material layer is prepared for subsequently preparing the grating structure. The first material layer is one of Ag, Al, and a dielectric material. Certainly, the first material layer is not limited to the three materials herein, while other materials capable of exciting surface plasmas may also be applied to the solutions of the present disclosure.

The photosensitive film layer is prepared by coating a photoresist on the first material layer, the grating pattern is obtained after exposure and development, and then further the grating pattern is transferred into the first material layer by etching, to obtain the grating structure prepared from the first material. Different etching processes may be selected according to different types of materials of the first material layer. The preparation of the grating structure is realized through the preparation of the photosensitive film layer.

FIG. 4A~FIG. 4J schematically show flowcharts of a process of preparing the super-resolution lens based on a metal-dielectric strip array according to embodiments of the present disclosure.

Figure 4A:
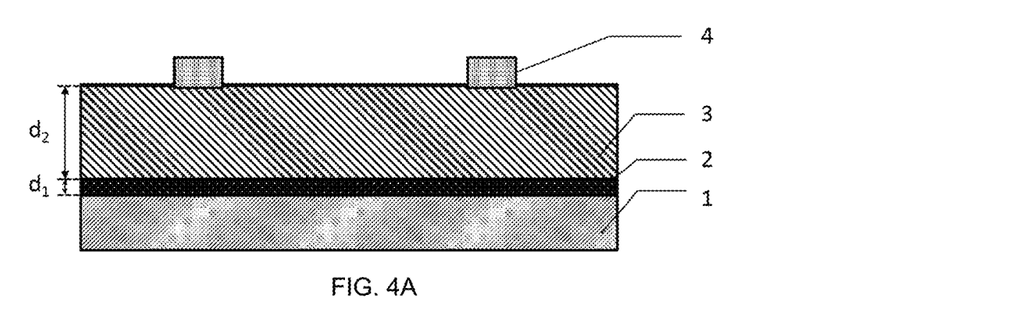
FIG. 4A~FIG. 4J schematically show flowcharts of a process of preparing a super-resolution lens based on a metal-dielectric strip array according to embodiments of the present disclosure.

FIG. 4A is a schematic diagram of obtaining the photosensitive film grating pattern through exposure and development on the photosensitive film layer, with a first substrate 1, a sacrificial layer 2, a first material layer 3, and a photosensitive film grating pattern 4 in sequence from bottom to top, equivalent to the preceding steps S11~S12.

Figure 4B:
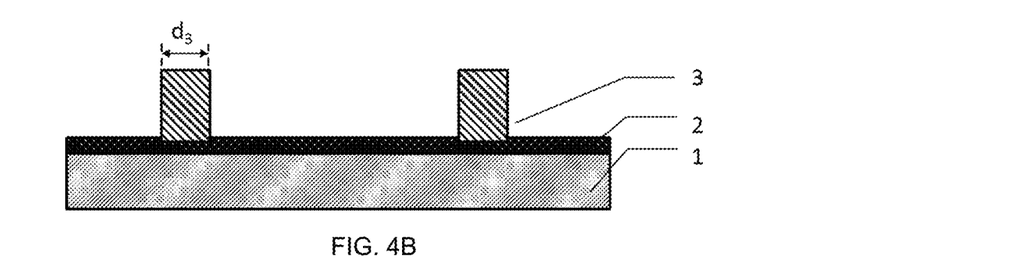

FIG. 4B shows etching the first material layer to transfer the photosensitive film grating pattern 4 into the first material layer 3 to obtain the grating structure, equivalent to the preceding step S13.

Figure 4C:
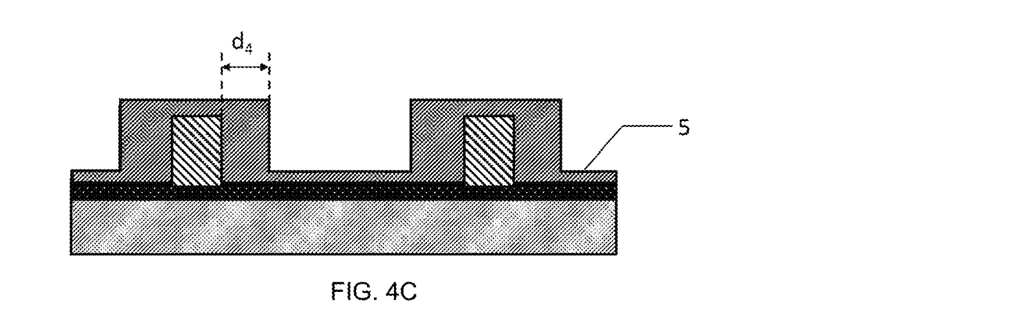

FIG. 4C shows depositing a second material layer 5 on the grating structure for a first time, wherein if the first material layer is of metal, the second material layer is of a dielectric material; and if the first material layer is of a dielectric material, the second material layer is of metal.

Figure 4D:
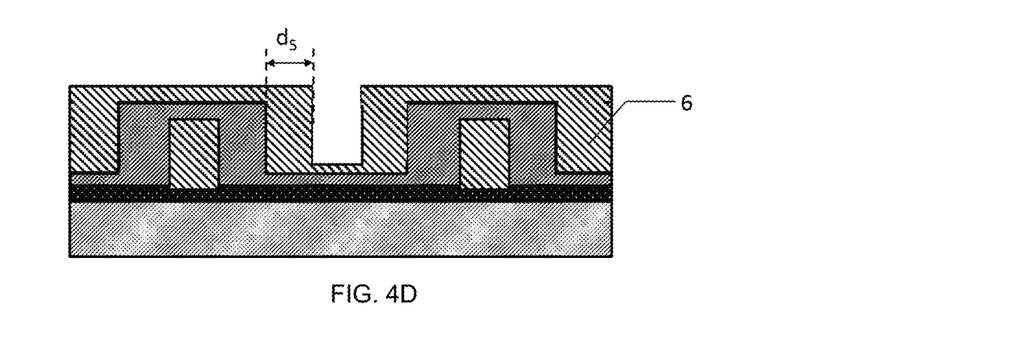

FIG. 4D shows depositing a third material layer 6 on the second material layer for a first time, wherein materials of the third material layer and the first material layer have the same property, for example, both are metal or both are dielectric material; further, materials of the third material layer and the first material layer may be the same, for example, both are $SiO_2$. In this embodiment, the materials of the third material layer 6 and the first material layer 3 are the same, so that the metal-dielectric strip array finally obtained is more periodic, rendering higher imaging uniformity.

Figure 4E:
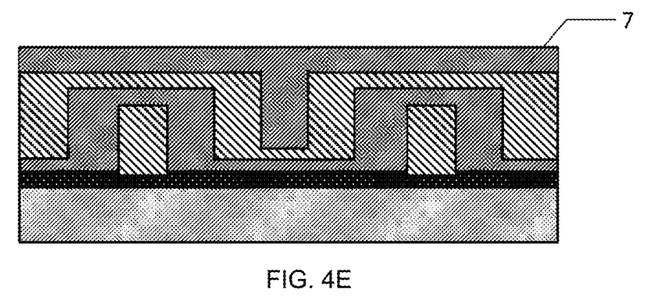

FIG. 4E shows depositing a second material layer 7 for a second time, wherein the grating structure is just filled up and becomes even after three times of metal-dielectric alternate deposition, then the deposition step is ended. FIG. 4E shows the first transition structure. FIG. 4C~FIG. 4E are equivalent to the preceding step S2.

Figure 4F:
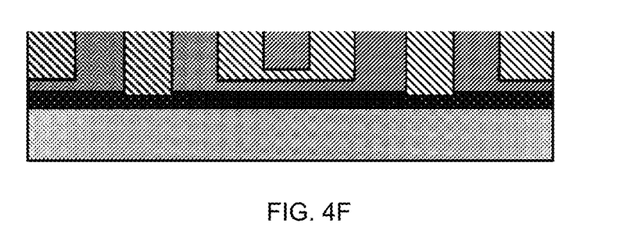

FIG. 4F shows performing planarization on the first transition structure, wherein the planarization is made in a depth direction, to reach at least a top portion of the grating structure, otherwise the metal-dielectric strip array finally cannot be obtained, and metal-dielectric multilayer structures will partially exist, affecting the imaging effect. FIG. 4F shows the second transition structure, equivalent to the preceding step S3.

Figure 4G:
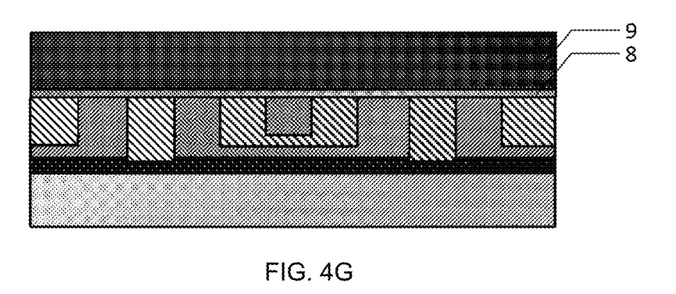

FIG. 4G shows adhering the upper surface of the second transition structure to the second substrate 9 by using a curing agent 8, equivalent to the preceding step S4.

Figure 4H:
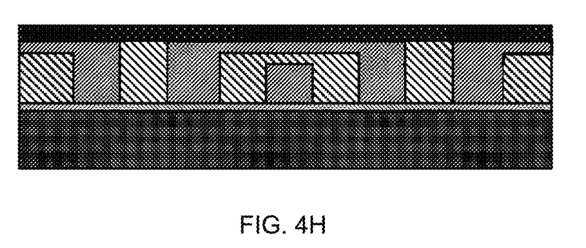

FIG. 4H shows removing the first substrate 1 through a stripping process, and performing overturning to make the second transition structure be on the second substrate 9.

Figure 4I:
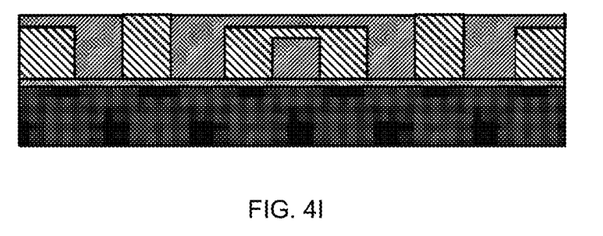

FIG. 4I shows removing the sacrificial layer 2 by a wet chemical method. FIG. 4I shows the third transition structure, equivalent to the preceding step S5.

Figure 4J:
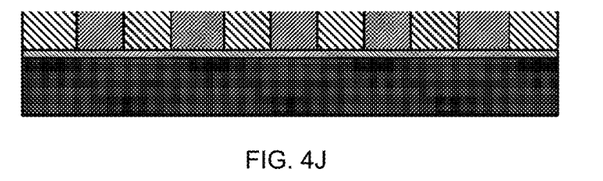

FIG. 4J shows performing planarization on the third transition structure, wherein the planarization is made in a depth direction, to at least reach a top portion of the second material layer or the third material layer finally deposited in S2. In this embodiment, the planarization is made in a depth direction, to reach the top portion of the third material layer finally deposited, and all the metal-dielectric multilayer structures are removed, to obtain the desired periodic structure of the metal-dielectric strip array. FIG. 4J is equivalent to the preceding step S6.

With the method for preparing a super-resolution lens based on a metal-dielectric strip array of the present disclosure, a three-dimensional multilayer film lens with resolution of ten nanometers or higher may be prepared just through conventional processes such as etching, alternately depositing of metal and dielectric film layers, pattern overturning, and planarization, thereby expanding the application range of super-resolution lithography technology.

Based on the above embodiments, S5 includes: removing the first substrate by stripping off the sacrificial layer, and performing overturning to make the second transition structure be on the second substrate. In the above, the stripping includes manual stripping or automatic stripping, and a solution used in the wet chemical method is one of aqua regia, nitric acid, and a chromium removal solution.

A material of the sacrificial layer may be Au, Cu, photosensitive resist, or other materials with low adhesion to the base. Different removal solutions are selected according to different materials. For example, when the material of the sacrificial layer is Au, the Au sacrificial layer may be removed with the chromium removal solution. On the basis of the above embodiments, a feature size $d_3$ of the grating structure in S1 is 5~300 nm, and a pattern duty cycle is 0.05~0.5.

The feature size of the grating structure determines the feature size of the strip structure and the initial position of the array.

On the basis of the above embodiments, the step of alternately depositing the second material layer and the third material layer on the grating structure in S2 includes: alternately depositing the second material layer of a second layer thickness and the third material layer of a third layer thickness on the grating structure, the second layer thickness being the same as or different from the third layer thickness.

When alternately depositing the metal and dielectric materials in S2, the layer thickness of the metal material deposited each time is the same, and the layer thickness of the dielectric material deposited each time is also the same, while the layer thickness of the metal material and the layer thickness of the dielectric material may be the same or different, as long as the periodic structure of the metal-dielectric strip array can be finally achieved.

On the basis of the above embodiments, the metal in S2 is one of Ag and Al, and the dielectric is one of $SiO_2$, $Al_2O_3$, and $MgF_2$.

Ag or Al is selected as the material of the metal film layer for exciting surface plasmas; and $SiO_2$, $Al_2O_3$, or $MgF_2$ are selected as the material of the dielectric film layer so as to match a dielectric constant of the metal film layer.

On the basis of the above embodiments, the performing planarization on the first transition structure in S3, and the performing planarization on the third transition structure in S6 include: performing the planarization on the first transition structure and the third transition structure by means of ion beam etching or chemical mechanical polishing.

Chemical mechanical polishing (CMP) is usually selected for a planarization process, or ion beam etching may also be selected. As a common process technology for implementing global planarization, CMP removes chemical reactants formed on a device surface through mechanical friction of abrasive particles. It is a technology for implementing ultra-precision surface processing and obtaining a polished surface, and has an excellent planarization effect.

On the basis of the above embodiments, the adhering the upper surface of the second transition structure to the second substrate in S4 includes: adhering the upper surface of the second transition structure to the second substrate with a curing agent. In the above, the first substrate is one of a silicon substrate, a quartz substrate, a magnesium fluoride substrate, and a flexible substrate; and the second substrate is one of a quartz substrate, a silicon substrate, and a sapphire substrate.

The curing agent is coated on the upper surface of the second transition structure, and the second transition structure is tightly adhered with the second substrate through the curing/adhering effect. Specifically, the curing agent may be a curing adhesive, such as an ultraviolet curing adhesive and a thermal curing adhesive. As to material selection of the first substrate and the second substrate, a difference lies in that for the first substrate, it only needs to satisfy the conditions of being flat and clean, while for the second substrate, in addition to being flat and clean, it also needs to meet application requirements of lens devices, such as the conditions of being transparent and thermally stable.

On the basis of the above embodiments, a lithography method for performing lithography on the first material layer on the first substrate in S1 is one of surface plasma lithography, electron beam direct writing lithography, and near field lithography.

The method for performing lithography on the first material layer is selected according to the type of the first material. For example, when the first material layer is of Al, the surface plasma lithography technology may be used for performing the lithography; and when the first material layer is of $SiO_2$, the conventional near field lithography technology may be used.

On the basis of the above embodiments, a deposition method of alternately depositing the second material layer and the third material layer on the grating structure in S2 is one of magnetron sputtering deposition, atomic layer deposition, chemical vapor deposition, and vacuum evaporation deposition.

When alternately depositing the metal and dielectric film layers on the grating structure, for example, when depositing an Ag film layer, magnetron sputtering deposition, atomic layer deposition, and chemical vapor deposition may be used, or a method of vacuum evaporation deposition may be selected; and when depositing an MgF$_2$ film layer, the magnetron sputtering deposition, atomic layer deposition, and chemical vapor deposition may be used, or the method of vacuum evaporation deposition may be selected.

The present disclosure further provides a super-resolution lens based on a metal-dielectric strip array. The super-resolution lens based on a metal-dielectric strip array is a super-resolution lens based on a metal-dielectric strip array obtained by the preceding method for preparing a super-resolution lens based on a metal-dielectric strip array.

The super-resolution lens is of a metal-dielectric strip array structure, rather than a metal-dielectric multilayer film structure, in which incident light is transmitted along the metal-dielectric interfaces, thereby avoiding energy loss caused by penetrating through the planar multilayer film, and significantly improving the energy utilization efficiency.

The present disclosure further provides use of the super-resolution lens obtained according to the preceding method for preparing a super-resolution lens based on a metal-dielectric strip array in super-resolution lithography.

For the super-resolution lens based on a metal-dielectric strip array obtained by the preparation method in the present disclosure, since the incident light does not need to penetrate through the metal film layer many times in a three-dimensional multilayer film structure, and is only transmitted along the metal-dielectric interfaces, the energy utilization efficiency is significantly improved, and the super-resolution lens can significantly improve the focusing imaging effect when applied to the super-resolution lithography.

Hereinafter, the present disclosure is further described with reference to embodiments. The above method for preparing a super-resolution lens based on a metal-dielectric strip array and use of the super-resolution lens are specifically described in the following examples. However, the following examples are merely illustrative of the present disclosure, while the scope of the present disclosure is not limited thereto.

The method for preparing a super-resolution lens based on a metal-dielectric strip array in the present example includes following steps:

step 1: selecting a flat first substrate 1;

step 2: preparing a sacrificial layer 2 on a surface of the first substrate 1, wherein a thickness of the sacrificial layer 2 is $d_1$=10~100 nm;

step 3: preparing a first material layer 3 on a surface of the sacrificial layer 2, wherein a thickness of the first material layer 3 is $d_2$=5~500 nm;

step 4: performing development on a photosensitive film layer through a lithography technology to obtain a photosensitive film grating pattern 4 with a required duty ratio, so as to obtain a grating structure prepared from the first material layer, wherein a grating feature size is $d_3$=5~300 nm, and a pattern duty cycle is controlled to be 0.05~0.5;

step 5: etching the photosensitive film grating pattern 4 obtained in step 4, to transfer the grating pattern in the photosensitive film layer into the first material layer 3, so as to obtain a grating structure, which is equivalent to the preceding step S1;

step 6: alternately depositing a second material layer 5 and a third material layer 6 on the grating structure obtained in step 5, wherein a thickness of the second material layer 5 deposited is $d_4$=5~300 nm, a thickness of the third material layer 6 deposited is $d_5$=5~500 nm, which is equivalent to the preceding step S2;

step 7: realizing film layer planarization of a surface of the finally deposited material layer through an etching or planarization process, which is equivalent to the preceding step S3;

step 8: adhering an upper surface of the planarized film layer to the second substrate 9 by using a curing adhesive, which is equivalent to the preceding step S4;

step 9: separating the sacrificial layer and a strip array structure from the first substrate 1 through a process of stripping off the sacrificial layer, and performing overturning to make the structure be on the second substrate 9, wherein the stripping may be manual stripping or automatic stripping;

step 10: removing the sacrificial layer 2 by a wet chemical removal method, which is equivalent to the preceding step S5; and step 11: finally completing the preparation of a metal-dielectric strip array structure through a planarization process, which is equivalent to the preceding step S6.

According to the above step 1~step 11, three specific examples are provided below.

Example 1

As shown in FIGS. 4A-4J, specific implementation steps are as follows.

(1) A first substrate 1 was of a quartz material. A sacrificial layer 2 was a gold film layer prepared and had a thickness of 20 nm. A first material layer 3 was an Al film layer and had a thickness of 200 nm. A lithography technology used was surface plasma lithography technology. A photosensitive film layer was an AR-P 3170 photoresist layer, with a thickness of 100 nm. A mask base material was quartz, a mask layer material was chromium, a mask structure pattern period was 60 nm, and line width was 10 nm. Illumination beam was 365 nm ultraviolet light.

(2) A grating pattern with a pre-set duty cycle was obtained in the photosensitive film layer through one super-resolution lithography and development process. The grating pattern was transferred into the Al film layer by means of etching, wherein the etching method is ICP etching. 20 nm SiO$_2$ film layer (the second material layer 5) and 10 nm Al film layer (the third material layer 6) were alternately deposited. A deposition method used for the SiO$_2$ film layer was electron beam evaporation deposition, and a deposition method used for the Al film layer was thermal evaporation deposition. Planarization was performed through a chemical mechanical polishing process. The strip array structure adhered with a silicon base (a second substrate 9) by using an ultraviolet curing adhesive under illumination of an ultraviolet lamp. After the first substrate 1 was stripped off, the pattern was made to be on the second substrate 9 by overturning. The sacrificial layer 2 was removed with a chromium removal solution. Planarization of the film layer was achieved through an ion beam etching process, to finally obtain the super-resolution lens structure of a metal-dielectric strip array.

Example 2

As shown in FIGS. 4A-4J, specific implementation steps are as follows.

(1) A first substrate 1 was of an Si material. A sacrificial layer 2 was of an AZ3100 photoresist layer structure prepared and had a thickness of 1000 nm. A first material layer 3 was an Ag film layer and had a thickness of 100 nm. A lithography technology used was electron beam direct writing lithography technology. A photosensitive film layer was a PMMA electron beam photoresist layer, with a thickness of 50 nm. A processed nano-pattern had a period of 100 nm and a line width of 25 nm.

(2) The processed nano-pattern was transferred into the first material layer 3 (Ag) by etching, wherein the etching method was IBE etching, and an etching angle used was 30°. 25 nm $MgF_2$ film layer and 25 nm Ag film layer were alternately deposited. A deposition method used for the $MgF_2$ film layer was radio frequency sputtering, and a deposition method used for the Ag film layer was direct current sputtering. Planarization was performed through an etching planarization process, and another quartz base (a second substrate 9) was adhered by using a thermal curing adhesive while being heated by a hot plate, a heating temperature being 100° C. After the first substrate 1 was stripped off, the pattern made to be on the second substrate 9 by overturning. The sacrificial layer 2 was removed with an acetone solution. The planarization of the film layer was realized through a chemical mechanical polishing process, to finally obtain the super-resolution lens structure of a metal-dielectric strip array.

Figure 5:
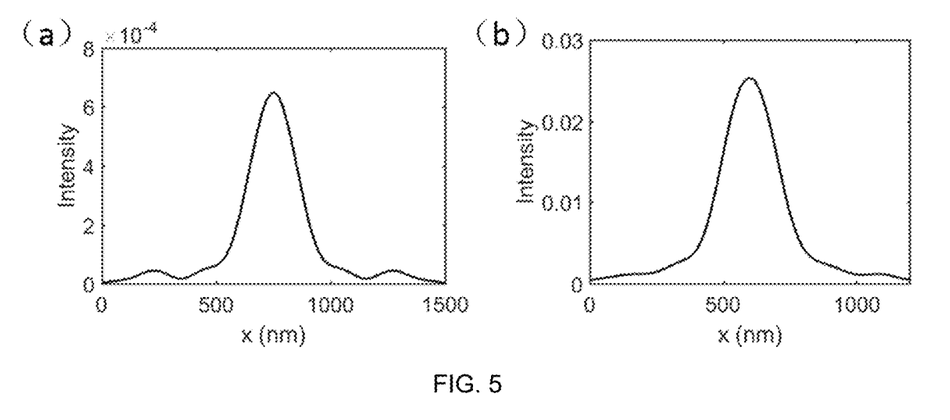
FIG. 5 schematically shows comparison graphs of energy utilization rates of the super-resolution lens structure based on a metal-dielectric strip array according to embodiments of the present disclosure and the existing super-resolution lens structure of metal-dielectric multilayer film.

FIG. 5 shows comparison graphs of energy utilization rates of the super-resolution lens structure obtained in the present example and the existing metal-dielectric multilayer film lens structure. As can be seen from FIG. 5, energy utilization efficiency of the present example is improved by 100 times compared with the existing planar multilayer film structure.

Example 3

As shown in FIGS. 4A-4J, specific implementation steps are as follows.

(1) A first substrate 1 was of a glass material. A sacrificial layer 2 was of an AZ1500 photoresist layer structure prepared and had a thickness of 500 nm. A first material layer 3 was an $SiO_2$ film layer and had a thickness of 500 nm. A lithography technology used was a near field lithography technology. A photosensitive film layer was a PHS photoresist layer, with a thickness of 30 nm. A processed nano-pattern had a period of 200 nm and a line width of 20 nm.

(2) The processed nano-pattern was transferred into the first material layer 3 ($SiO_2$) by etching, wherein the etching method was reactive ion beam etching (RIE), and an etching gas used was $CHF_3$ gas. 30 nm Ag film layer and 20 nm $SiO_2$ film layer were alternately deposited. A deposition method used for the Ag film layer was thermal evaporation deposition, and a deposition method used for the $SiO_2$ film layer was atomic layer deposition. Planarization was performed through a chemical mechanical planarization process, and another quartz base (a second substrate 9) was adhered for 2 hours under an ultraviolet 365 nm light source. After the first substrate 1 was stripped off, the pattern was made to be on the second substrate 9 by overturning. The sacrificial layer 2 was removed with a sulfuric acid solution. The planarization of the film layer was realized through an etching process, to finally obtain the super-resolution lens structure of a metal-dielectric strip array.

The above-mentioned embodiments further illustrate the objectives, the technical solutions, and the beneficial effects of the present disclosure in detail. It should be understood that the above-mentioned are merely embodiments of the present disclosure, rather than limiting the present disclosure. Any modification, equivalent replacements, improvements and so on made within the spirit and principle of the present disclosure should be covered within the scope of protection of the present disclosure.

What is claimed is:

1. A method for preparing a super-resolution lens based on a metal-dielectric strip array, comprising:
   S1, performing lithography on a first material layer on a first substrate to obtain a grating structure;
   S2, alternately depositing a second material layer and a third material layer on the grating structure until the grating structure is filled up and becomes even, so as to obtain a first transition structure, wherein one of the second material layer and the third material layer is of metal, and the other one is of dielectric;
   S3, performing planarization on the first transition structure, wherein the planarization is made in a depth direction, to at least reach a top portion of the grating structure, so as to obtain a second transition structure;
   S4, adhering an upper surface of the second transition structure to a second substrate;
   S5, removing the first substrate, and performing overturning to make the second transition structure be on the second substrate, to obtain a third transition structure; and
   S6, performing planarization on the third transition structure, wherein the planarization is made in a depth direction, to at least reach a top portion of the second material layer or the third material layer which is finally deposited in S2, so as to obtain the super-resolution lens based on a metal-dielectric strip array.

2. The method for preparing a super-resolution lens based on a metal-dielectric strip array according to claim 1, wherein the S1 comprises:
   S11, preparing a sacrificial layer, the first material layer, and a photosensitive film layer on the first substrate in sequence from bottom to top;
   S12, performing exposure and development on the photosensitive film layer to obtain a photosensitive film grating pattern; and
   S13, etching the first material layer, to transfer the photosensitive film grating pattern into the first material layer to obtain the grating structure.

3. The method for preparing a super-resolution lens based on a metal-dielectric strip array according to claim 2, wherein the preparing the sacrificial layer in S11 comprises:
   preparing the sacrificial layer on the first substrate by a method of magnetron sputtering deposition, chemical vapor deposition or coating, wherein the sacrificial layer is of one selected from the group consisting of Au, Cu, and a photosensitive resist.

4. The method for preparing a super-resolution lens based on a metal-dielectric strip array according to claim 2, wherein the preparing the first material layer in the S11 comprises:
   preparing the first material layer on the sacrificial layer by a method of magnetron sputtering deposition, atomic layer deposition, chemical vapor deposition or vacuum evaporation deposition, wherein the first material layer is of one selected from the group consisting of Ag, Al, and a dielectric material.

5. The method for preparing a super-resolution lens based on a metal-dielectric strip array according to claim 2, wherein the S5 comprises:
   removing the first substrate by stripping, and performing overturning to make the second transition structure be on the second substrate; and removing the sacrificial layer by a wet chemical method, to obtain a third transition structure,
wherein the stripping comprises manual stripping or automatic stripping, and a solution used in the wet chemical method is one selected from the group consisting of aqua regia, nitric acid, and a chromium removal solution.

6. The method for preparing a super-resolution lens based on a metal-dielectric strip array according to claim 1, wherein for the grating structure in the S1, a feature size is 5~300 nm, and a pattern duty cycle is 0.05~0.5.

7. The method for preparing a super-resolution lens based on a metal-dielectric strip array according to claim 1, wherein the alternately depositing the second material layer and the third material layer on the grating structure in the S2 comprises:
alternately depositing the second material layer of a second layer thickness and the third material layer of a third layer thickness on the grating structure, the second layer thickness being same as or different from the third layer thickness,
wherein the metal in the S2 is one selected from the group consisting of Ag and Al, and the dielectric is one selected from the group consisting of $SiO_2$, $Al_2O_3$, and $MgF_2$.

8. The method for preparing a super-resolution lens based on a metal-dielectric strip array according to claim 1, wherein the performing planarization on the first transition structure in the S3, and the performing planarization on the third transition structure in the S6 comprise:
performing the planarization on the first transition structure and the third transition structure by ion beam etching or chemical mechanical polishing.

9. The method for preparing a super-resolution lens based on a metal-dielectric strip array according to claim 1, wherein the adhering the upper surface of the second transition structure to the second substrate in the S4 comprises:
adhering the upper surface of the second transition structure and the second substrate with a curing agent,
wherein the first substrate is one of a silicon substrate, a quartz substrate, a magnesium fluoride substrate, and a flexible substrate; and the second substrate is one of a quartz substrate, a silicon substrate, and a sapphire substrate.

10. The method for preparing a super-resolution lens based on a metal-dielectric strip array according to claim 1, wherein a lithography method for performing lithography on the first material layer on the first substrate in the S1 is one of surface plasma lithography, electron beam direct writing lithography, and near field lithography.

11. The method for preparing a super-resolution lens based on a metal-dielectric strip array according to claim 1, wherein a deposition method of alternately depositing the second material layer and the third material layer on the grating structure in the S2 is one of magnetron sputtering deposition, atomic layer deposition, chemical vapor deposition, and vacuum evaporation deposition.

12. A super-resolution lens based on a metal-dielectric strip array, wherein the super-resolution lens based on a metal-dielectric strip array comprises a super-resolution lens based on a metal-dielectric strip array obtained by the method for preparing a super-resolution lens based on a metal-dielectric strip array according to claim 1.

13. Use of a super-resolution lens obtained by the method for preparing a super-resolution lens based on a metal-dielectric strip array according to claim 1 in super-resolution lithography.

* * * * *